3,099,601
BACTERIN IN AQUEOUS POLYETHYLENE, MINERAL OIL EMULSION
William True Davis, Jr., and Fred M. Murdock, St. Joseph, Mo., assignors to Anchor Serum Company, St. Joseph, Mo., a corporation of Missouri
No Drawing. Filed Oct. 2, 1959, Ser. No. 843,950
2 Claims. (Cl. 167—78)

This invention relates to the preparation of a bacterin in a solid base.

Normally bacterins are injected into animals in the form of liquid suspensions. Such injections require relatively large dosages, e.g., 5 cc. or more.

It is an object of the present invention to devise a bacterin composition which can be employed in smaller dosages than were used previously.

An additional object is to prepare a bacterin composition which is suitable for giving prolonged immunity.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the use of a composition comprising a bacterin, an emulsion of an oil, preferably a mineral oil and an emulsifying agent, and a thickening agent. The resulting composition is normally solid or semi-solid and can be injected either subcutaneously or intromuscularly. Preferably the composition is injected with the aid of a gun, e.g., of the type disclosed in Moore and Malton, Patent No. 2,624,338. It has been found that the use of 0.2 to 0.25 cc. of the solid bacterin composition of the present invention is equivalent in immunizing effect to 5 cc. of the corresponding standard liquid bacterin compositions. Additionally, the immunizing effect has been observed to be more prolonged when utilizing the solid bacterin compositions of the invention.

Typical bacterins which can be utilized include those of Leptospira, blackleg, erysipelas, Clostridium perfringens Type D, etc.

As the oil there can be utilized a mineral oil or even vegetable oils such as sesame oil and peanut oil. As the emulsifying agent there can be used sorbitan sesquioleate, lanolin, mannide monooleate, sodium lauryl sulfate, sodium dodecylbenzene sulfonate, sorbitan monolaurate, polyoxyethylene sorbitan monooleate etc. Preferably 10% of the emulsifying agent is used with 90% of the oil although the proportions are not critical, e.g., the emulsifying agent can be 5 to 20% of the total of the oil and emulsifying agent.

As the thickening agent or stabilizer to prevent separation, there can be used materials such as carbopol 934 (which is a polyethylene glycol in a water in oil emulsion), polyethylene wax and materials such as plastibase 50W (a mixture of 95% of heavy liquid petrolatum and 5% high molecular weight polyethylene). The preferred thickening agent is plastibase 50W. The thickening agent serves as a vehicle and should be present in an amount sufficient to render the composition semi-solid or solid.

In the following examples the compositions were prepared by homogenizing the oil and emulsifying agent and adding the homogenate to the bacterin-vehicle mixture. The resulting formulation was thoroughly admixed to form a heavy non-separable base incorporating the bacterin, then placed in a cartridge of a gun of the type referred to and injected subcutaneously in the animal to be immunized in a dosage of 0.25 cc.

Unless otherwise stated, all parts and percentages are by weight.

Example I

Leptospira pomona, strain T 262 was prepared as follows:

To media A containing 91,500 ml. of distilled water, 192 grams of sodium chloride, 13.2 grams of 1-aspargine and 26.8 grams of ammonium chloride was added sufficient of buffer B containing 8000 ml. distilled water, 133.6 grams disodium hydrogen phosphate and 17.2 grams of potassium dihydrogen phosphate to adjust the pH to 7.6–7.8. 2000 cc. aliquots were put in separate flasks and each flask seeded with 6–7 cc. of the Leptospira pomona culture, 5% rabbit serum and 5 cc. of magnesium chlorine and thiamine solution. The flasks were incubated at 30–32° C. for 12 days and 0.3% formalin added at the time of harvest.

The mixture was then centrifuged at 2000 r.p.m. for 30 minutes, and the supernatant discarded down to where the pellet and remainder of supernatant totaled 12.5 cc. This 12.5 cc. gave 400 doses of the final bacterin.

To 12.5 parts of the bacterin and 50 parts of plastibase 50W were added 37.5 parts of an emulsion containing Bayol F (mineral oil) and Arlacel A (sorbitan sesquioleate) in the ratio of 9 to 1.

The bacterin was injected subcutaneously into hamsters with the following results:

| Number of Hamsters | Amount Vaccine, ml. | Results after Exposure (Dead over Survivals) |
|---|---|---|
| 5 | 0.25 | 0/5 |
| 5 | 0.5 | 0/5 |
| 5 | 0.75 | 0/5 |
| 5 | 0.0 | 5/5 |

Example II

Example I was repeated utilizing Erysipelothrix rhusiopathiae strains CD 3461, CN 3342, SE 9 and AN 4 in equal portions as the bacterin. The bacterin was prepared as follows. An aqueous culture medium was employed containing 3% malt extract, 0.9% ox bile, 0.02 ascorbic acid, 3% beef extract, 3% yeast extract, and 2% peptone. The pH was adjusted to 8.2–8.4 and the mixture sterilized. Then 5000 cc. of the media was seeded with 7–8 cc. of a 24 to 26 hour culture of the appropriate strain and 5% of normal horse serum and 0.5% of glucose was added. The mixture was incubated for 48 hours at 37.5° C. and 10% formalin solution added in an amount to give a concentration of 0.4%. Then 1326 cc. of 2% aqueous aluminum oxide were added and 1% of merthiolate to give a final concentration of 1:10,000.

The mixture was allowed to stand for 5 days whereupon ⅔ of the supernatant was decanted and destroyed. The final sedimentation gave a 5 cc. dose. Each of the four above identified strains were handled in like manner and then mixed together. From the mixture, a 2000 cc. aliquot was centrifuged at 2000 r.p.m. for 30 minutes and the supernatant discarded down to where the pellet and remainder of the supernatant totalled 12.5 cc. It was possible to obtain 400 doses from this 12.5 cc.

To 12.5 parts of the bacterin thus prepared and 50 parts of plastibase 50W were added 37.5 parts of an emulsion containing Bayol F (mineral oil) and Arlacel A (sorbitan sesquioleate) in the ratio of 9 to 1.

The bacterin was injected inter-parentally into mice with the following results:

| Number mice | Amount Vaccine, ml. | Results after Exposure (Dead over Survivals) |
|---|---|---|
| 60 | 0.1 | 32/60 |
| 60 | 0.2 | 19/60 |
| 60 | 0.25 | 17/60 |
| 60 | 0.0 | 52/60 |

*Example III*

Example II was repeated utilizing a mixture of equal proportions of *Clostridium chauvoei* and *Clostridium septicus*. The bacterin was prepared as follows. An aqueous culture medium was employed containing 100,000 ml. of distilled water; 100 lbs. ground pork liver, 500 grams NZ amine Type A (an enzymatic casein hydrolysate containing all of the amino acids present in casein), 500 grams NZ amine Type B (a pancreatic casein digest), 300 grams of yeast extract, 32 grams calcium chloride, 65 grams cystine and 150 grams of potassium citrate. The pH was adjusted to 8.2–8.4. The mixture was seeded with a 24 to 26 hour culture of the appropriate organism, e. g., *Clostridium chauvoei* and 70 cc. of 50% aqueous glucose was also added. The mixture was then incubated for 6 days at 37.5° C. and 1% formalin and 1400 cc. of 2% aqueous aluminum oxide per 7000 cc. of culture were also added. Four days later 50% of the material was decanted.

Then the *Clostridium chauvoei* formulation was combined with an equal amount of the *Clostridium septicus* formulation to prepare the bacterin. From the above a 2000 cc. aliquot was centrifuged at 2000 r.p.m. for 30 minutes and the supernatant discarded down to where the pellet and remainder of the supernatnat totaled 12.5 cc. This was sufficient for 400 doses.

To 12.5 parts of the bacterin thus prepared and 50 parts of plastibase 50W were added 37.5 parts of an emulsion containing Bayol F and Arlacel A in the ratio of 9 to 1.

The bacterin was injected subcutaneously into pigs with the following results:

| Number pigs | Amount Vaccine, ml. | Results after Exposure (Dead over Survivals) |
|---|---|---|
| 10 | 0.5 | chauvoei 1/5. septicus 1/5. |
| 10 | 1.0 | chauvoei 0/5. septicus 1/5. |
| 10 | 0.0 | chauvoei 5/5. septicus 5/5. |

In each group of ten pigs, above, five were challenged with *Clostridium chauvoei* and 5 were challenged with *Clostridium septicus*.

As will be appreciated by those skilled in the art, each production batch of the bacterins vary in antigenicity to some degree. However, the examples give the preferred formulation which, of course, can be modified to suit the particular bacterin batch employed.

What is claimed is:

1. A semi-solid to solid composition consisting essentially of a bacterin, an emulsion of a mineral oil and an emulsifying agent selected of a group consisting of sorbitan sesquioleate, lanolin, mannide monooleate, sodium lauryl sulfate, sodium dodecylbenzene sulfonate, sorbitan monolaurate, and polyoxyethylene sorbitan monooleate, and a thickening agent comprising a mixture of a major amount of a heavy liquid petrolatum and a minor amount of polyethylene.

2. A solid composition consisting essentially of about 12½% bacterins, 37½% of an emulsion of a mineral oil and an emulsifying agent selected from the group consisting of sorbitan sesquioleate, lanolin, mannide monooleate, sodium lauryl sulfate, sodium dodecylbenzene sulfonate, sorbitan monolaurate, and polyoxyethylene sorbitan monooleate, and 50% of a mixture of a major amount of a heavy liquid petrolatum and a minor amount of polyethylene.

References Cited in the file of this patent
UNITED STATES PATENTS
2,529,461   Schneiderwirth _____ Nov. 7, 1950

OTHER REFERENCES

Freund, Annual Review of Microbiology, pp. 295–307.
Brandly et al., Am. J. Vet. Res., July 1946, pp. 313, 321–323.
Mutimer et al., J.A.P.A., Sci. Ed., p. 104, Feburary 1956.